United States Patent [19]

Herrmann et al.

[11] Patent Number: 4,483,286

[45] Date of Patent: Nov. 20, 1984

[54] PISTON

[75] Inventors: Rüdiger Herrmann, Aichwald; Detlef Schlosser, Kirchheim; Heinz Wimmer, Leonberg, all of Fed. Rep. of Germany

[73] Assignee: Mahle GmbH, Stuttgart, Fed. Rep. of Germany

[21] Appl. No.: 366,152

[22] Filed: Apr. 7, 1982

[30] Foreign Application Priority Data

Apr. 8, 1981 [DE] Fed. Rep. of Germany ....... 3114124

[51] Int. Cl.$^3$ .......................... F02B 75/08; B23P 15/10
[52] U.S. Cl. ............................ 123/193 P; 29/156.5 R; 123/668
[58] Field of Search ........... 123/668, 669, 657, 193 R, 123/193 P; 29/156.5 R

[56] References Cited

U.S. PATENT DOCUMENTS

| | | | |
|---|---|---|---|
| 607,317 | 7/1898 | Woodworth | 123/668 |
| 3,082,752 | 3/1963 | Thomas | 123/669 |
| 3,807,014 | 4/1974 | Hummer | 123/193 P |
| 4,345,138 | 8/1982 | Zammert | 29/156.5 R |
| 4,401,726 | 8/1983 | Gnanamuthu | 29/156.5 R |

FOREIGN PATENT DOCUMENTS 2921952 12/1980 Fed. Rep. of Germany ...... 123/668

*Primary Examiner*—Craig R. Feinberg
*Attorney, Agent, or Firm*—Murray, Whisenhunt and Ferguson

[57] ABSTRACT

For a piston consisting of an Al-Si alloy having a mean linear grain diameter of the Silicon eutectic of more than 3 μm for combustion engines and provided with a hard-oxidized top, the structure of the base material to be oxidized is subjected to a grain refinement in the depth to be oxidized so that the silicon eutectic has a mean linear grain diameter of less than 3 μm, preferably less than 2.5 μm. By this means, the resistance to erosion of the hard-oxide layer is improved. The grain refinement may be effected in the respective zones during the casting of the piston or thereafter by re-melting those zones prior to oxidizing. If the risk of erosion exists only in specific locally limited zones of a relatively large hard-oxide surface, then a grain refinement confined to these zones is sufficient.

7 Claims, 1 Drawing Figure

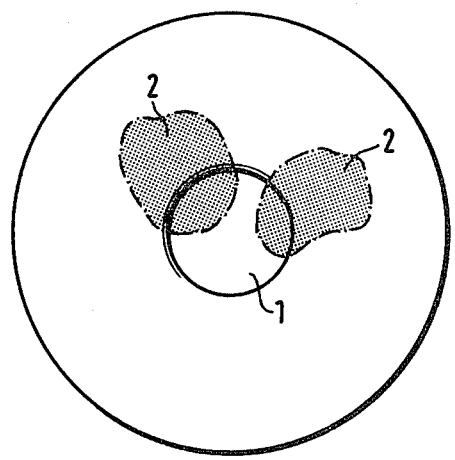

PISTON

BACKGROUND TO THE INVENTION

The invention relates to a piston consisting of an Al-Si alloy and having a hard-oxidised top.

STATEMENT OF PRIOR ART

Hard-oxide layers on the tops of pistons for internal combustion engines serve the purpose of increasing the resistance of the piston material to changes in temperature in the top zone of the piston which is exposed to the combustion gases. In this respect, the hard-oxide layers usually applied until the present day have indeed proved to be quite satisfactory in practice.

However, what is unsatisfactory is in some cases the resistance to erosion of the hard-oxide layers applied hitherto to piston tops consisting of Al-Si alloys. Particularly in direct-injection engines, there may occur inadmissably extensive erosions in those zones of the piston top on which the fuel jets impinge.

OBJECT OF THE INVENTION

It is the main object of the present invention to provide an improvement in the erosion resistance of the piston alloy.

According to the invention there is provided a method of making a piston for reciprocation within a cylinder of an internal combustion engine in which the fuel entering the cylinder is directly injected onto the top surface of the piston, comprising forming a piston body from an aluminum base alloy containing a silicon eutectic having a mean linear grain diameter of more than 3 $\mu$m, forming at least one discrete region of the top surface of the piston body a grain refinement so that the silicon eutectic in that region has a mean linear diameter less than 3 $\mu$m, and forming a hard oxide layer at least the grain refined region of the top surface of the piston body.

Preferably the piston base material to be converted into oxide has a structure that is as fine-grained as possible. Normal cast Al-Si piston alloys have a structure with a mean linear grain diameter of the silicon eutectic of between approximately 5 and 8 $\mu$m. Hard oxide layers applied thereon in the usual way are in practice incapable of having the resistance to erosion which is necessary during the use of internal-combustion-engine-pistons. This applies particularly to the tops of the pistons for direct-injection engines. In these applications, erosion causes the hard-oxide layer applied to be almost entirely destroyed after relatively short operating periods. If the grain structure of the same piston base material is changed according to the invention in that zone of the material which is converted into the hard-oxide layer to be applied in such a way that the mean linear grain diameter of the silicon eutectic in that zone is at least below 3 $\mu$m, then the erosion behaviour of the layer is very considerably improved. The improvement is the greater, the smaller the respective grain diameter is set. In general optimum results are achieved if the mentioned grain diameter is less than 2.5 $\mu$m. To bring about the result according to the invention, it is sufficient if in fact only that zone of the piston base material which is converted into the hard-oxide layer to be applied is grain-refined in this way.

The grain refinement may be effected by a local re-melting treatment, for which purpose charge carrier beams, such as an electric arc or electron beams, are particularly suitable and may be run in lines across the areas to be treated.

In cases where the resistance to erosion has to be improved only in individual zones of the hard-oxide layer of the piston top, it suffices if the grain refinement is effected in the structure of only these zones to a locally limited extent.

BRIEF DESCRIPTION OF DRAWING

The invention will hereinafter be explained in more detail with the aid of the exemplified embodiment shown in the drawing.

DESCRIPTION OF PREFERRED EMBODIMENTS

The drawing shows a top view of the top of a piston comprising a combustion trough 1. The piston base material is an Al-Si alloy which is composed as follows in percent by weight: 11–13 Si; 0.8–1.5 Cu; 0.8–1.3 Mg; 0 to 1.3 Ni; 0 to 0.7 Fe; 0 to 0.2 Ti; 0 to 0.3 Mn; 0 to 0.3 Zn; the remainder Al. The material is processed into the rough shape of the piston by way of casting. The structure of the material is distinguished by a mean linear grain diameter of the silicon eutectic of between approximately 5 and 8 $\mu$m. Before the hard-oxide layer is applied, the piston top is machined by stock removal. When the piston is finished, a hard-oxide layer, which has been applied in the conventional way, covers the entire piston top including the combustion-space trough. The thickness of the hard-oxide layer ranges from 50 to 90 $\mu$m. A grain refinement along the lines of the invention is effected prior to anodising or other treatment producing the hard oxide layer. The grain refinement is confined to the zones 2 which are directly exposed to the impact of the fuel jets. The grain refinement is brought about by re-melting the piston base material. Depthwise, the grain refinement is effected so as to be slightly deeper than the depth zone in which the base material is converted into the hard-oxide layer. The mean linear grain diameter of the eutectic silicon in the grain-refined zones ranges from larger than 2 to smaller than 2.5 $\mu$m. Re-melting is brought about by an electric arc which is generated between a tungsten electrode and the workpiece in the way that is usual in inert-gas tungsten arc welding. The pool is screened from the atmosphere by shielding with argon gas.

In order to test the erosion behaviour, a trial was carried out, in which diesel fuel was sprayed at room temperature on a test specimen from a conventional fuel injection pump. The abrasion of material measured according to a specific unit of time was taken as the criterion for the erosion. According thereto, the abrasion of material in a cast structure without any grain refinement and having a mean linear grain diameter of the silicon eutectic alloy of between 5 and 8 $\mu$m was 6.5 mg as compared to 0 mg in the structure refined to 2–2.5 $\mu$m.

The structure is subjected to a grain refinement along the lines of the invention has the further advantage that the thickness of the hard-oxide layer to be produced thereon, which usually varies considerably in conventional structures without any grain refinement, can be kept within close tolerances.

We claim:

1. A method of making a piston for reciprocation within a cylinder of an internal combustion engine in which the fuel entering the cylinder is directly injected onto a top surface of the piston, comprising:
  (a) forming a piston body from an aluminum base alloy containing a silicon eutectic having a mean linear grain diameter of more than 3 μm;
  (b) forming on at least one discrete region of the top surface of the piston body a grain refinement with an upper surface so that the silicon eutectic in that region has a mean linear diameter less than 3 μm; and
  (c) forming a hard oxide layer by oxidization of the upper surface of at least the grain refined region.

2. A method according to claim 1, wherein the grain refining is effected such that the mean linear diameter of the silicon eutectic is less than 2.5 μm.

3. A method according to claim 1, wherein the piston body is first cast and the grain refining is effected after casting by means of localized re-melting of the aluminum base alloy with a charge carrier beam.

4. A method according to claim 1, wherein the grain refining is effected by mould casting a piston body in which the grain refined region is formed during casting by placing thin walled inserts into the mould in the region of the top surface of the piston, which inserts are formed of aluminum base alloy containing a silicon eutectic having a mean linear grain size of less than 3 μm, which inserts do not completely dissolve but become intermetallically joined to the casting, and thereafter forming a hard oxide layer by oxidization of the upper surface of at least the grain refined region.

5. A piston according to claim 1, wherein the hard oxide layer is 50 to 90 μm thick.

6. A method according to claim 1, wherein said grain refining is carried out at two discrete regions on the top surface of the piston.

7. A method according to claim 6, wherein the oxide layer is formed only over said discrete regions.

* * * * *